March 14, 1961 E. W. MANNING 2,975,357

TRANSFORMER

Filed Sept. 26, 1958

Inventor,
Emmett W. Manning,
by Gilbert P. Tarleton
His Attorney.

2,975,357
Patented Mar. 14, 1961

2,975,357

TRANSFORMER

Emmett W. Manning, Pittsfield, Mass., assignor to General Electric Company, a corporation of New York Filed Sept. 26, 1958, Ser. No. 763,693

6 Claims. (Cl. 323—44)

Figure 1:
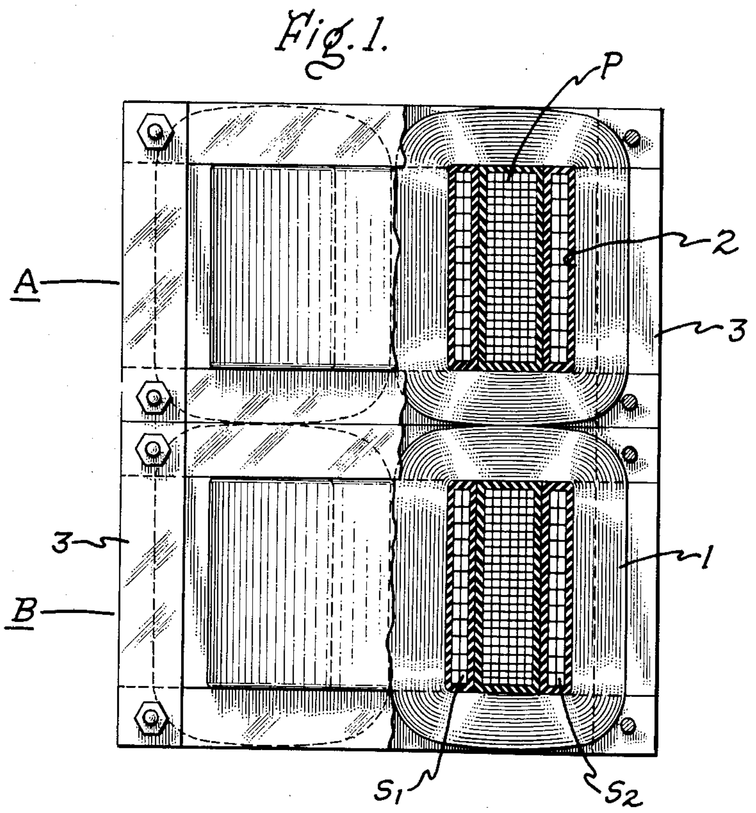

This invention relates to the use of two single phase transformers to simulate delta to Y and Y to delta three phase transformers. By the term to simulate delta to Y and Y to delta three phase transformers is meant to provide their functional equivalent.

It is well known in the art to use two single phase transformers to simulate a Y to Y or delta to delta three phase transformer. This can be accomplished by connecting 0.866 taps of the primary and secondary windings of one transformer to mid-point taps of the primary and secondary windings respectively of the other transformer. Single phase transformers connected in such a manner are known in the art as T connected transformers inasmuch as the primary and secondary of one transformer is connected in a T to the primary and secondary respectively of the other transformer. They are also known as Scott connected transformers, Scott being responsible for some of the earlier work on T connected transformers.

In the electrical distribution industry, delta to Y and Y to delta three phase transformers are widely used. However, until my invention it has not been known how to use two single phase transformers to simulate a Y to delta or delta to Y three phase transformer. In a Y to delta or delta to Y three phase transformer there is a thirty degree shift or displacement between the primary and secondary voltages. The previously mentioned T or Scott connected transformer will not provide this displacement. Therefore, it does not lend itself to parallel operation with Y to delta or delta to Y three phase transformers. Y to delta and delta to Y three phase transformers are widely used by electrical utilities because they provide advantages which are not provided by Y to Y or delta to delta three phase transformers.

It is an object of this invention to provide a way of using two single phase transformers to simulate Y to delta and delta to Y three phase transformers.

In my invention the primary of one single phase transformer is T connected to the primary of another single phase transformer and the secondary of the second transformer is T connected to the secondary of the first transformer. In each T connection the voltage ratio between one winding and the one it is T connected to is about 0.866 to 1. This ratio can be obtained when two identical single phase transformers are used by providing 0.866 taps in the primary of one and the secondary of the other. Alternately, the primary of one can be prewound with 0.866 of the number of turns of the primary of the other and the secondary of the second can be prewound with 0.866 of the number of turns of the secondary of the first. It will be obvious to those skilled in the art that it will not always be possible or practicable to arrive at an exact ratio of 0.866 to 1. When this ratio is not met the result is unbalanced voltages in the secondary. However, a departure of say not more than several percent from this ratio would still give satisfactory simulation of delta to Y and Y to delta three phase transformers. Therefore, the term about 0.866 to 1 is intended to include such departure. Of course, it will be understood that as the magnitude of the departure from the ratio of 0.866 to 1 is increased, the variance from the functional equivalent of delta to Y and Y to delta three phase transformers is correspondingly increased. Therefore, in the preferred form of the invention a ratio of 0.866 to 1 or as close thereto as possible and practicable is preferred.

Figure 2:
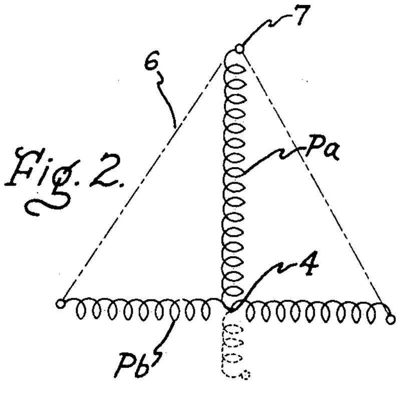
Figure 3:
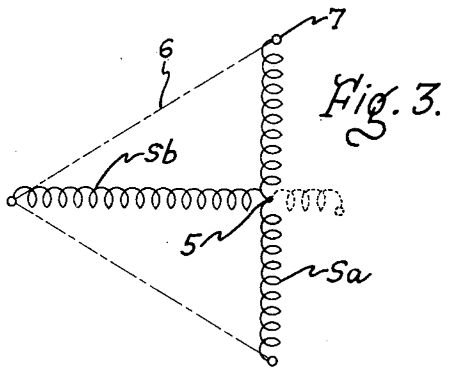

While the specification concludes with claims particularly pointing out and distinctly claiming the subject matter which I regard as my invention, it is believed the invention will be better understood from the following description taken in connection with the accompanying drawing, in which:

Fig. 1 is a partly broken away front view of two stacked single phase transformers incorporating one form of my invention; and Fig. 2 is a diagrammatic illustration of the primary windings of Fig. 1 and their interconnection; and Fig. 3 is a diagrammatic illustration of the secondary windings of Fig. 1 and their interconnection.

In Fig. 1 are shown two single phase transformers A and B which are stacked one upon the other. The magnetic core of each transformer comprises two closed magnetic core loops 1. Core loops 1 are illustrated as being curved core loops, but they can also be made from stacked plates. The two core loops 1 of each transformer are butted up against each other along one of their sides to provide a central core leg for each core. Primary and secondary windings on each core surround each central core leg and extend through the two window openings 2 of each core. The secondary winding can be divided into two sections $S_1$ and $S_2$ and by suitable subsections the secondary can be arranged for either parallel or series operation. The primary winding P is positioned between the two secondary sections $S_1$ and $S_2$.

The two single phase transformers do not have to be stacked. They could be positioned alongside each other or even in separate tanks. However, stacking is preferred since then a single tank with a relatively small bottom can be used which can be readily mounted on a line pole or the like. The two stacked single phase transformers can be rigidly held into a unitary structure by clamp plates 3 which are bolted or otherwise fastened together.

Referring now to Figs. 2 and 3, in my invention a Y to delta or a delta to Y three phase transformer is simulated by T connecting the primary winding $P_a$ of transformer A to the mid-point 4 of the primary winding $P_b$ of transformer B, and T connecting the secondary winding $S_b$ of transformer B to the mid-point 5 of the secondary winding $S_a$ of transformer A, in which the voltage or active turn ratio of $P_a$ to $P_b$ and $S_b$ to $S_a$ equals about 0.866 to 1. The secondary winding sections $S_1$ and $S_2$ for each transformer are series connected and, therefore, they are illustrated as continuous secondary windings $S_b$ and $S_a$ in Fig. 3. In the event both transformers have identical windings the desired 0.866 to 1 ratio can be obtained by taking 0.866 taps in windings $P_a$ and $S_b$. That is to say, the turns of windings $P_a$ and $S_b$ shown in full lines would be active and the remaining turns shown in broken lines would be inactive. However, 0.866 taps in the windings $P_a$ and $S_b$ can be avoided by prewinding the winding $S_b$ to have only 0.866 the number of turns of winding $S_a$ and the same for $P_a$ with respect to $P_b$. In such event the broken line inactive part of windings $P_a$ and $S_b$ would be absent from Figs. 2 and 3. That is to say, a terminal of each of such prewound windings $P_a$ and $S_b$ would be directly connected to mid-point taps 4 and 5 respectively of windings $P_b$ and $S_a$. A ratio of 0.866 to 1 between the turns presupposes that the voltage per winding turn is uniform. Obviously, this will not be true when the voltage per winding turn is not the same. However, in such a case the ratio of the voltage across $P_a$ to that across $P_b$ and the voltage across $S_b$ to that across $S_a$ will still be 0.866 to 1.

The secondary windings of both transformers have been illustrated in Fig. 1 as being divided into two sections $S_1$ and $S_2$ which are positioned on opposite sides of primary winding P. This is how single phase transformers are conventionally constructed. Although this arrangement is not absolutely necessary, it is preferred in my invention so as to obtain approximately the same reactance between winding $S_b$ and each half of winding $P_b$ and the same reactance between winding $P_a$ and each half of winding $S_a$. Additionally, although the invention is illustrated with series connected secondary winding sections the invention is not restricted thereto. That is to say, Y to delta or delta to Y three phase transformers having parallel connected secondary winding sections can be simulated by having 0.866 taps in the two secondary winding sections of transformer B and mid-point taps in the two secondary winding sections of transformer A.

In Figs. 2 and 3 straight lines 6 drawn through the three end terminals 7 of the T-connected windings illustrate the equivalent deltas of these windings. It will be noted that the two deltas are shifted with respect to each other by thirty degrees which is a simulation of the phase shift in Y to delta and delta to Y three phase transformers.

My invention makes it possible to build the functional equivalent of Y to delta and delta to Y three phase transformers with two sets of single phase transformer parts. This is particularly advantageous in small transformers, say of the distribution type which are used on line poles or the like, since these are used in large quantity and great savings can be achieved with less expensive mass produced single phase parts. For instance, the cost of building two single phase cores is about two-thirds the cost of building a comparable three phase conventional core. Also, single phase core clamps which can be used are less expensive than the core clamps of conventional three phase cores. Then, too, smaller single phase pole type tanks may be used and the units are as small or smaller and lighter in weight than corresponding conventional three phase units. Additionally, since the three phase transformer of my invention is built from typical single phase parts, the percent IR and IX drops are of about the same value as for single phase pole type units. Thus, the voltage regulation will be of the same order of magnitude as for single phase pole type units. That is to say, at 0.8 power factor the percent regulation will be about 2 to 2½ percent instead of about 3 to 3½ which is true of conventional three phase units.

While there has been shown and described particular embodiments of the invention, it will be obvious to those skilled in the art that changes and modifications may be made without departing from the invention, and therefore, it is intended by the appended claims to cover all such changes and modifications as fall within the true spirit and scope of the invention.

What I claim as new and desire to secure by Letters Patent of the United States is:

1. The combination of two single phase transformers which are interconnected to simulate Y to delta and delta to Y three phase transformers, each of said two transformers having a primary and secondary winding, the primary winding of one transformer being T connected to the mid-point of the primary winding of the other transformer, and the secondary winding of said other transformer being T connected to the mid-point of the secondary winding of said one transformer, and each of said windings which is T connected having a voltage ratio with respect to the winding to which it is T connected of about 0.866 to 1.

2. In the combination of claim 1, wherein said two transformers are stacked one upon the other, and the secondary winding of each transformer being divided into two series connected sections which are positioned on opposite sides of the primary winding of their respective transformer.

3. In the combination of claim 1, wherein each of said two transformers comprises a pair of side by side magnetic core loops which are linked together by their respective primary and secondary windings, said two transformers being stacked one upon the other, clamping means for said core loops which holds said transformers together in said stacked relationship, and each of said secondary windings being divided into two series connected sections which are disposed on opposite sides of the primary winding of their respective transformer.

4. In combination, a pair of magnetic cores each of which is linked by a separate pair of electrical windings, one winding of each pair having an electrical mid-point tap connected to a terminal of the other winding of the other pair, the voltage ratio of each mid-tapped winding to the winding it is connected to being about 1 to 0.866.

5. In combination, two pairs of windings each with a voltage ratio of about 0.866 to 1 in which a terminal of the 0.866 winding is connected to the electrical mid-point of the unity winding, a common magnetic core for the 0.866 winding of one pair and the unity winding of the other pair, and a separate magnetic core common to the other two windings.

6. Transformer means for providing a thirty degree phase shift in a symmetrical three phase voltage comprising, in combination, two pairs of windings each with a voltage ratio of about 0.866 to one in which a terminal of the 0.866 winding is connected to the electrical mid-point of the unity winding, a common magnetic core for the 0.866 winding of one pair and the unity winding of the other pair, and a separate magnetic core common to the remaining two windings.

References Cited in the file of this patent

UNITED STATES PATENTS

| | | |
|---|---|---|
| 919,338 | Frank | Apr. 27, 1909 |
| 1,227,415 | Fortescue | May 22, 1917 |